United States Patent
Lashina et al.

(10) Patent No.: US 10,708,999 B2
(45) Date of Patent: Jul. 7, 2020

(54) METHOD OF VISUALIZING A SHAPE OF A LINEAR LIGHTING DEVICE

(71) Applicant: SIGNIFY HOLDING B.V., Eindhoven (NL)

(72) Inventors: Tatiana Aleksandrovna Lashina, Eindhoven (NL); Bartel Marinus Van De Sluis, Eindhoven (NL); Dzmitry Viktorovich Aliakseyeu, Eindhoven (NL); Philips Steven Newton, Waalre (NL); Tim Dekker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/752,993

(22) PCT Filed: Jul. 21, 2016

(86) PCT No.: PCT/EP2016/067355
§ 371 (c)(1),
(2) Date: Feb. 15, 2018

(87) PCT Pub. No.: WO2017/029061
PCT Pub. Date: Feb. 23, 2017

(65) Prior Publication Data
US 2018/0255625 A1    Sep. 6, 2018

(30) Foreign Application Priority Data
Aug. 20, 2015 (EP) .................... 15181687

(51) Int. Cl.
*G06F 3/041* (2006.01)
*H05B 47/19* (2020.01)
(Continued)

(52) U.S. Cl.
CPC ............. *H05B 47/19* (2020.01); *G06F 3/041* (2013.01); *G06F 3/0488* (2013.01); *H05B 45/00* (2020.01); *H05B 47/155* (2020.01); *Y02B 20/48* (2013.01)

(58) Field of Classification Search
CPC ...... H05B 47/19; H05B 45/00; H05B 47/155; G06F 3/041; G06F 3/0488; Y02B 20/48
See application file for complete search history.

(56) References Cited

U.S. PATENT DOCUMENTS

| 5,307,295 A | 4/1994 | Taylor et al. |
| 2005/0184674 A1* | 8/2005 | Kaler .................. B65H 75/364 |
| | | 315/169.3 |

(Continued)

FOREIGN PATENT DOCUMENTS

| WO | 2007099318 A1 | 9/2007 |
| WO | 2014027275 A1 | 2/2014 |
| WO | 2015104248 A1 | 7/2015 |

OTHER PUBLICATIONS

"A Revolution in LED Colour Changing Light Control, Using WIFI Technology and Your Mobile Device!" Oct. 2014 (4 Pages).

*Primary Examiner* — Jose R Soto Lopez

(57) ABSTRACT

A computer implemented method (500) of generating a virtual representation (110) of a linear lighting device (120) is disclosed. The computer implemented method (500) comprises the steps of receiving (502) one or more signals (130) comprising an identifier of the linear lighting device (120) and information about a number and a distribution of the plurality of linearly distributed light sources, which linear lighting device (120) comprises a plurality of linearly distributed light sources, identifying (504) the linear lighting device (120) based on the received one or more signals (130), capturing one or more images of the linear lighting device (120) and providing image information representing the one or more images, determining (506) a spatial distribution of the light sources based on the received one or more signals (130) and the image information, generating (508) the virtual representation (110) of the shape of the linear lighting device (120) based on the spatial distribution, and (Continued)

displaying (510) the virtual representation (110) of the shape of the linear lighting device (120). This method allows a receiving device, for example a user interface device (100) such as a smart phone, to generate a virtual representation (110) of the linear lighting device (120) based on the received one or more signals (130) and the image information.

17 Claims, 5 Drawing Sheets

(51) Int. Cl.
*H05B 45/00* (2020.01)
*H05B 47/155* (2020.01)
*G06F 3/0488* (2013.01)

(56) References Cited

U.S. PATENT DOCUMENTS

| | | |
|---|---|---|
| 2010/0045705 A1 | 2/2010 | Vertegaal et al. |
| 2011/0074672 A1 | 3/2011 | Diederiks et al. |
| 2013/0063042 A1 | 3/2013 | Bora et al. |
| 2014/0232294 A1 | 8/2014 | Fredricks |
| 2015/0207849 A1* | 7/2015 | Chen .................... G06F 3/0482 715/736 |
| 2016/0037293 A1* | 2/2016 | Jovicic ................. H04B 10/116 398/118 |
| 2016/0381767 A1* | 12/2016 | Tiberi ................. G06F 3/04817 715/736 |

* cited by examiner

METHOD OF VISUALIZING A SHAPE OF A LINEAR LIGHTING DEVICE

CROSS-REFERENCE TO PRIOR APPLICATIONS

This application is the U.S. National Phase application under 35 U.S.C. § 371 of International Application No. PCT/EP2016/067355, filed on Jul. 21, 2016, which claims the benefit of European Patent Application No. 15181687.3, filed on Aug. 20, 2015. These applications are hereby incorporated by reference herein.

FIELD OF THE INVENTION

The invention relates to a computer implemented method of generating a virtual representation of a linear lighting device. The invention further relates to a computer program product for performing the method and a computer readable storage medium for storing the computer readable computer program product. The invention further relates to a user interface device for generating a virtual representation of a linear lighting device.

BACKGROUND

Current and future home and professional environments may contain linear lighting devices, such as LED strips. These linear lighting devices may comprise individually controllable light sources, and these devices can be mounted in a variety of different shapes and configurations. Current lighting control systems arranged for controlling LED strips with individually addressable light sources do not take the shape or segmentation of the LED strip into account. For the creation of a specific light effect, either automatically or manually, information about the LED strip's shape and its segments may be required. Furthermore, a representation of the LED strip's shape can also make it easier for the user to identify a specific LED strip in the user interface. Thus, there is a need in the art for a system for determining the shape and/or the segments of an LED strip.

SUMMARY OF THE INVENTION

It is an object of the present invention to provide a virtual representation of a shape of a linear lighting device. It is a further object of the present invention to provide the possibility for a user to adjust the virtual representation of the shape of the linear lighting device.

According to a first aspect of the present invention, the object is achieved by a computer implemented method of generating a virtual representation of a linear lighting device, which linear lighting device comprises a plurality of linearly distributed light sources, the computer implemented method comprising the steps of:

receiving one or more signals comprising an identifier of the linear lighting device and information about a number and a distribution of the plurality of linearly distributed light sources, identifying the linear lighting device based on the received one or more signals, capturing one or more images of the linear lighting device (120) and providing image information representing the one or more images, determining a spatial distribution of the light sources based on the received one or more signals and the image information, generating the virtual representation of the shape of the linear lighting device based on the spatial distribution, and displaying the virtual representation of the shape of the linear lighting device.

This method allows a receiving device, for example a user interface device such as a smart phone, a tablet pc, a smart watch, etc., arranged for capturing the one or more images to determine, based on image information retrieved via for example image processing, the spatial distribution of the light sources, and to generate a virtual representation of the linear lighting device based on the received one or more signals and the image information. The information about the number and distribution of the plurality of linearly distributed light sources may, for example, be mapped on the shape that has been determined from the captured one or more images. Based on image information, it may be determined that the linear lighting device has a specific shape, and the number and distribution of light sources may be mapped on the specific shape in order to determine how the light sources are spatially distributed along the linear lighting device. By mapping the information about the number and distribution of the plurality of linearly distributed light sources on the shape that has been determined from the image information, an accurate spatial distribution, and therewith an accurate virtual representation, can be determined. This virtual representation may be displayed, for example on a display of the user interface device, thereby communicating the shape of the linear lighting device to a user operating the user interface device. This may further allow a user to control, for example, segments of the linear lighting device by providing control input via a user interface which may, for example, display the virtual linear lighting device.

The received one or more signals comprise information about a number and a distribution of the light sources on the linear lighting device. This is advantageous because it provides a receiving device, such as a user interface device, additional information for generating the virtual representation.

In an embodiment of the computer implemented method, the received one or more signals further comprise information about the physical shape of the linear lighting device. This is advantageous because it provides a receiving device, such as a user interface device, additional information for generating the virtual representation.

In an embodiment of the computer implemented method, the one or more signals are radio frequency signals received from the linear lighting device. The one or more signals may be received directly from the linear lighting device or from a further device. The advantage of using radio frequency signals is that many user interface devices are already equipped with one or more radio frequency receivers, which may remove the requirement for dedicated hardware to establish communication between the user interface device and the linear lighting device.

In an embodiment of the computer implemented method, the one or more signals are light signals emitted by the linear lighting device. Current and future LED based lighting devices may be arranged for emitting a modulated light signal, and many user interface devices may comprise a light sensor (e.g. a photoelectric sensor, a camera, etc.) and processing means to decode the modulated light signal which would remove the requirement for a dedicated communication protocol between the linear lighting device and the user interface device.

In a further embodiment the computer implemented method further comprises the steps of:

analysing the image information and retrieving an embedded code from the image information, which embedded code is comprised in a light emission of the linear lighting device, and identifying the linear lighting device based on the embedded code.

A plurality of images may be taken to identify the embedded code emitted by the linear lighting device, which allows, besides identification, further information communication from the linear lighting device to the user interface device. For example, the linear lighting device may communicate the current lighting settings of the individual light sources enabling the user interface device to detect the spatial distribution of the light sources.

In an embodiment of the computer implemented method, the computer implemented method further comprises the steps of:

providing at least one control point with a position on the virtual representation of the linear lighting device, receiving a first user input representative of a selection of a control point, receiving a second user input representative of a repositioning of the control point on the virtual representation of the linear lighting device, generating an adjusted shape of the virtual representation based on the repositioning of the control point, and displaying the adjusted shape of the virtual representation of the linear lighting device. This embodiment is advantageous because it allows a user to adjust the shape of the linear lighting device by repositioning one or more control points via the user interface.

In a further embodiment of the computer implemented method, the computer implemented method further comprises the steps of:

associating the position of the control point relative to the virtual representation with a position of at least one light source of the plurality of light sources relative to the linear lighting device, and adjusting the light output of the at least one light source when the control point is selected or repositioned. In this embodiment, the user interface device communicates to the linear lighting device which light source is selected/repositioned by the user, thereby providing a visual aid for the user while the virtual representation of the linear lighting device is adjusted.

According to a second aspect of the present invention, the object is achieved by a computer program product for a computing device, the computer program product comprising computer program code to perform any one of the above-mentioned computer implemented methods when the computer program product is run on a processing unit of the computing device.

According to a third aspect of the present invention, the object is achieved by a computer readable storage medium for storing the above-mentioned computer readable computer program product.

According to a fourth aspect of the present invention, the object is achieved by a user interface device for generating a virtual representation of a linear lighting device, which linear lighting device comprises a plurality of linearly distributed light sources, the user interface device comprising:

a receiver arranged for receiving one or more signals comprising an identifier of the linear lighting device and information about a number and a distribution of the plurality of linearly distributed light sources, an image capture means for capturing one or more images of the linear lighting device (120), a processor arranged for identifying the linear lighting device based on the received one or more signals, and for determining a spatial distribution of the light sources based on the received one or more signals and image information representative of the one or more images, and for generating the virtual representation of the shape of the linear lighting device based on the spatial distribution, and a display arranged for displaying the virtual representation of the shape of the linear lighting device.

In an embodiment of the user interface device, the user interface device further comprises a user input element arranged for receiving a user input, which user input is representative of an adjustment of the shape of the virtual representation of the linear lighting device, and the display is arranged for displaying an adjusted shape of the virtual representation of the linear lighting device. This embodiment is advantageous because it allows a user to adjust the shape of the virtual representation of the linear lighting device.

In a further embodiment of the user interface device, the processor is further arranged for providing at least one control point with a position on the virtual representation of the linear lighting device, and the user input element is arranged for receiving a first user input representative of a selection of a control point and a second user input representative of a repositioning of the control point on the virtual representation of the linear lighting device, and the processor is further arranged for generating the adjusted shape of the virtual representation based on the repositioning of the control point. This embodiment is advantageous because it allows a user to adjust the shape of the virtual representation of the linear lighting device by moving control points via the user interface of the linear lighting device. The user interface, may, for example, comprise a touch screen arranged for receiving the user input.

BRIEF DESCRIPTION OF THE DRAWINGS

The above, as well as additional objects, features and advantages of the disclosed lighting devices, lighting systems and methods, will be better understood through the following illustrative and non-limiting detailed description of embodiments of devices and methods, with reference to the appended drawings, in which.

DETAILED DESCRIPTION OF EMBODIMENTS

Figure 1:
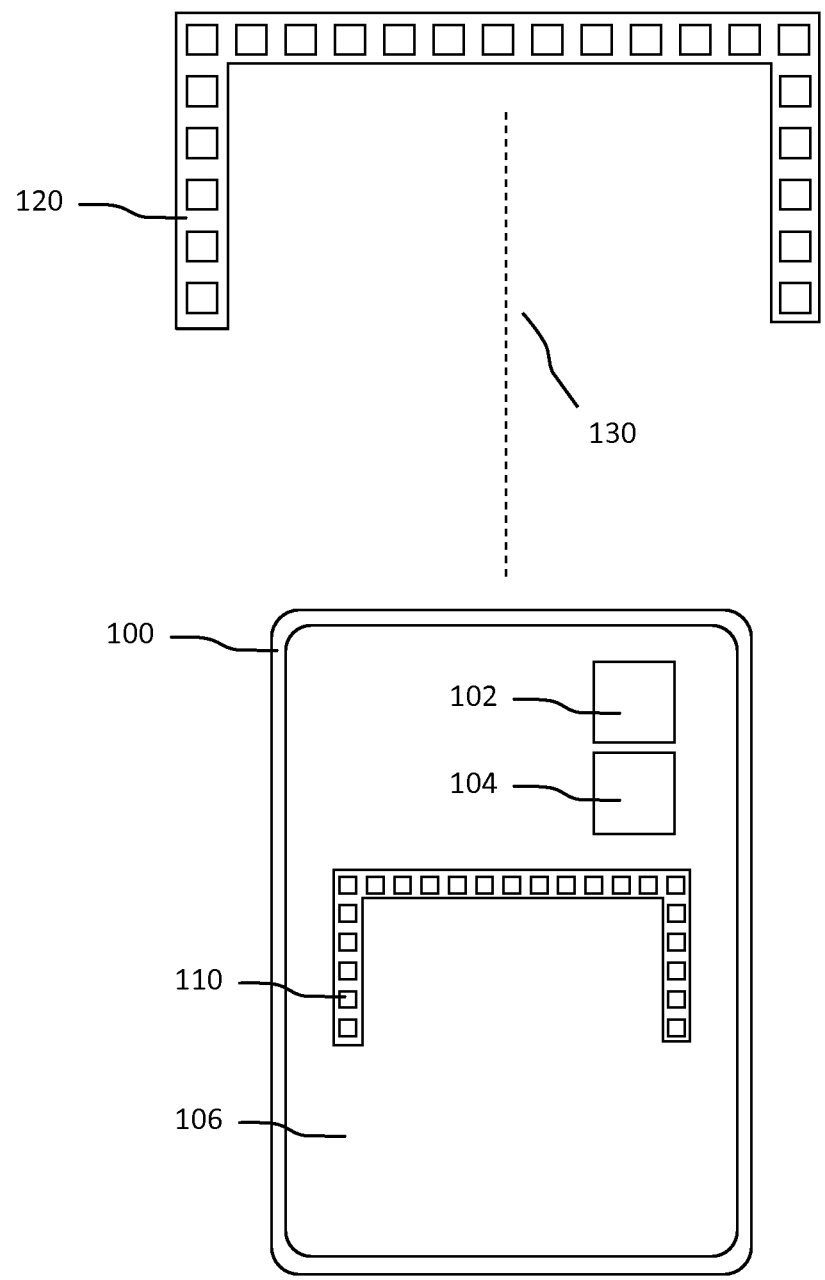
FIG. 1 shows schematically an embodiment of a user interface device according to the invention for generating a virtual representation of a linear lighting device.

FIG. 1 shows schematically an embodiment of a user interface device 100 according to the invention for generating a virtual representation 110 of a linear lighting device 120. The user interface device 100 comprises a receiver 102 for receiving one or more signals 130 comprising an identifier of the linear lighting device 120, which linear lighting device 120 comprises a plurality of linearly distributed light sources. The one or more signals 130 further comprise information about a number and a distribution of the plurality of linearly distributed light source. The user interface device 100 further comprises an image capture means 200 for capturing one or more images of the linear lighting device 120. The user interface device 100 further comprises a processor 104 (e.g. a micro controller, a microchip, circuitry, etc.) for identifying the linear lighting device 120 based on the received one or more signals 130 and for determining a spatial distribution of the light sources based on the received one or more signals 130 and image information representative of the one or more images. The processor 104 is further arranged for generating the virtual representation 110 of the shape of the linear lighting device 120 based on the spatial distribution. The user interface device 100 further comprises a display 106 for displaying the virtual representation 110 of the shape of the linear lighting device 120. The user interface device 100 may be any kind of user interface device 100 such as a smartphone, a pc, a tablet pc, smart goggles, etc.

The linear lighting device 120 may be any type of linear lighting device arranged for emitting light. The linear lighting device 120 may comprise LED light sources, OLED light sources, incandescent light sources, fluorescent light sources, etc. The linear lighting device 120 may be arranged for providing general lighting, task lighting, ambient lighting, atmosphere lighting, accent lighting, informative lighting, etc. The linear lighting device 120 may be installed in a luminaire, or it may be installed on a wall/ceiling/floor, behind a cove, on furniture such as a cabinet, tv-cabinet, closet, table, etc. The linear lighting device 120 may be connected to a home/office/public/private network, which network may further allow communications between the linear lighting device 120 and the user interface device 100.

The receiver 102 of the user interface device 100 is arranged for receiving one or more signals 130 comprising an identifier of the linear lighting device 120 and information about a number and a distribution of the plurality of linearly distributed light sources. Various wired and wireless communication technologies that are known in the art may be used for receiving the one or more signals 130 from the lighting device (e.g. Bluetooth, Wi-Fi, ZigBee, DMX, DALI, Power over Ethernet, Power Line Communication, etc.). A specific communication technology may be selected based on the communication capabilities of the user interface device 100, the type of linear lighting device 120 and/or the communication range of the wireless signals 130. Many user interface devices 100 (e.g. smartphones) and linear lighting devices 120 (e.g. Philips Hue) today are already equipped with one or more wireless communication technologies, which may be advantageous because this may reduce the effort to create a communication link between the user interface device 100 and the linear lighting device 120.

Additionally or alternatively, the receiver 102 is arranged for receiving a light signal 130 from the linear lighting device 120. The light signal 130 from the linear lighting device 120 may comprise an embedded code. The embedded code may be created by controlling a time-varying, modulated current to the light source of the light emitting device to produce variations in the light output that are detectable by a light detector, such as a camera, a photoelectric sensor, an image sensor, etc. The receiver 102 may comprise such a sensor for receiving the light signal 130, thereby allowing the processor 104 to identify the linear lighting device 120 and to determine the number and spatial distribution of the light sources.

Figure 2:
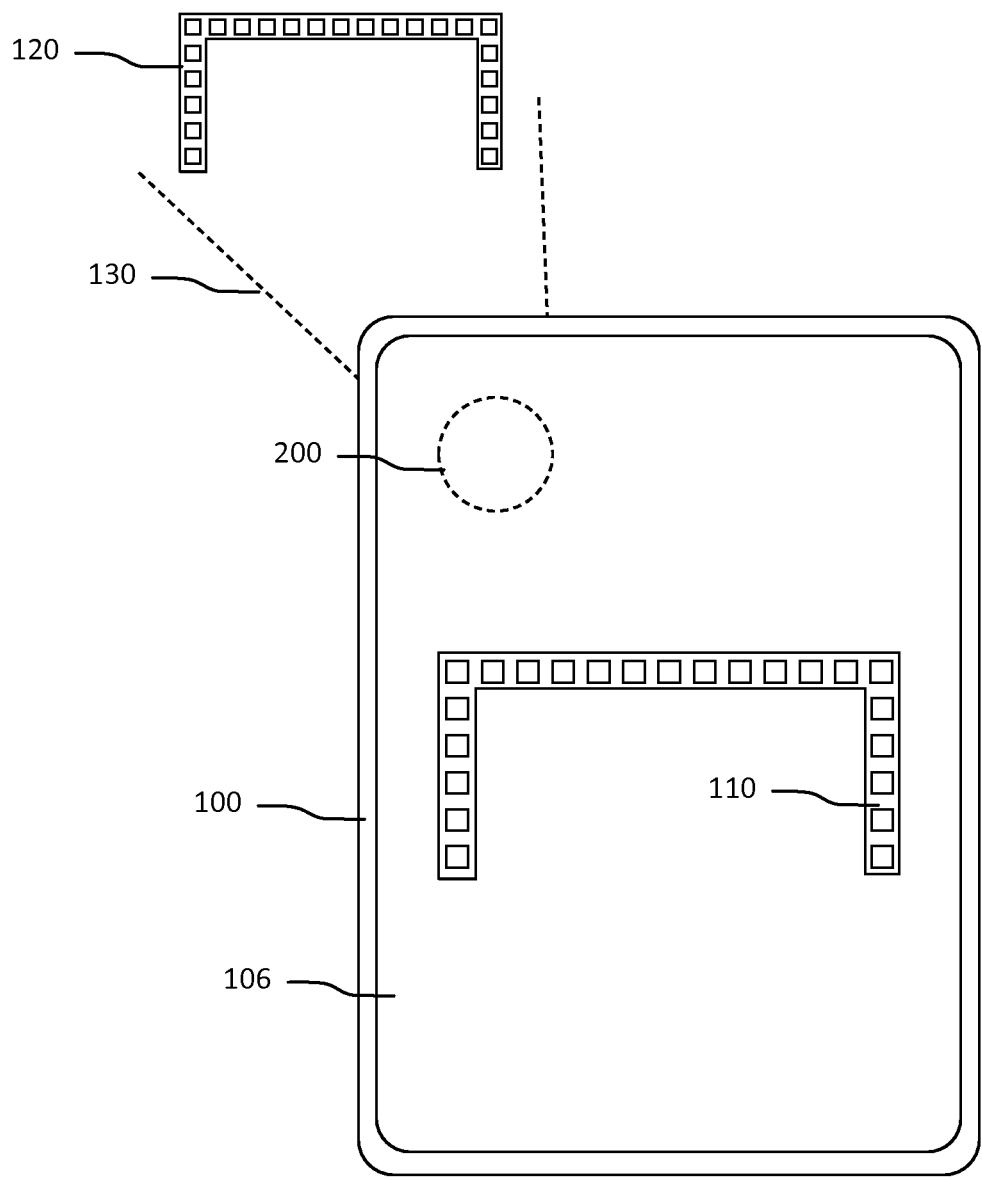
FIG. 2 shows schematically an embodiment of a user interface device according to the invention, wherein the user interface device comprises a camera arranged for capturing one or more images of the linear lighting device.

Additionally, the user interface device 100 comprises an image capture means 200 (such as a camera in the upcoming example), arranged for capturing the one or more images of (the light output of) the linear lighting device 120, and for providing image information representing the one or more images. The processor 104 may be further arranged for analysing the image information in order to detect an embedded code. Based on the embedded code the processor 104 may identify the linear lighting device 120. The processor 104 is further arranged for determining a spatial distribution of the plurality of light sources of the linear lighting device 120. In FIG. 2, the user interface device 100 comprises a camera 200 arranged for capturing the one or more images of the linear lighting device 120. Upon capturing the one or more images, the image information may be communicated to the processor 104 which may use image processing techniques to extract the shape, number of light sources, physical distribution, etc. from the image information. Upon determining these characteristics of the linear lighting device 120, the processor 104 may generate the virtual representation 110 of the linear lighting device 120, and the display 106 may display the virtual representation 110 of the linear lighting device 120.

The processor 104 of the user interface device 100 is arranged for identifying the linear lighting device 120 based on the received signal 130. The signal 130 may, for example, comprise data comprising a unique identifier of the linear lighting device 120, information about the type of linear lighting device 120, its colour properties, brand/type information, communication properties, number of light sources, distribution of light sources, etc. Alternatively, the processor 104 may determine one or more properties (such as information about the type of linear lighting device 120, its colour properties, brand/type information, communication properties, number of light sources, distribution of light sources, etc.) of the linear lighting device 120 by accessing a memory arranged for storing information representative of associations between lighting device identifiers and the properties. Upon accessing the memory, the received identifier may be compared to the stored identifiers, and the properties of the identified linear lighting device 120 may be retrieved from the memory. The memory may be comprised in the user interface device, or the memory may be accessible via any communication protocol. The processor 104 may be further arranged for determining the spatial distribution of the light sources based on the properties. For example, if the properties comprise information related to the type of linear lighting device 120, the processor may determine the spatial distribution based thereon. If, for example, a property indicates that a linear lighting device is a TLED (tubular LED), the light sources are distributed at fixed locations relative to each other, whereas the spatial distribution of light sources of a flexible LED strip is not fixed, because the shape of the LED strip may be determined by a user. Such properties provide additional information for the processor 104 to determine the spatial distribution of the light sources.

Figure 3A:
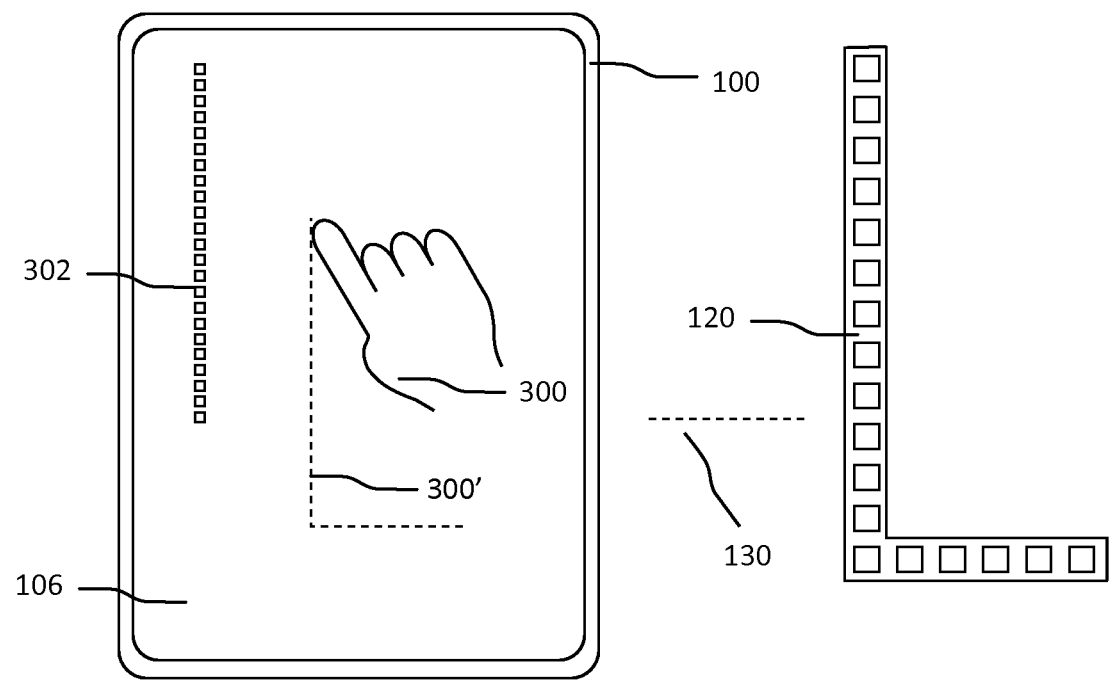
FIGS. 3a and 3b show schematically embodiments of a user interface device receiving a user input, which user input indicates the shape of the virtual representation of the linear lighting device.

The processor 104 is further arranged for determining a spatial distribution of the light sources based on the received one or more signals 130. The received one or more signals 130 comprise information about the number of light sources of the linear lighting device 120. Information about the number of light sources may be used for generating an initial virtual representation 110 (which initial virtual representation 110 may not correspond to the actual shape of the linear lighting device) of the lighting device (e.g. a circle, or a straight line as illustrated in FIG. 3a). The processor 104 may be arranged for mapping the information about the number and distribution of the plurality of linearly distributed light sources on a shape that has been determined from the captured image. The processor 104 may, for example, determine, based on image information from the one or more images, that the linear lighting device 120 is L-shaped. The processor 104 may map the number (e.g. 20) and distribution (e.g. equally distributed) of light sources on the L-shape in order to determine how the light sources are spatially distributed along the L-shaped linear lighting device 120.

The one or more signals 130 may further comprise information about the distribution of the light sources. The light sources may, for example, not be distributed evenly over the length of the linear lighting device 120, or they may be distributed over various segments. Information about the distribution of light sources may be used for generating the virtual representation 110 of the lighting device (e.g. a square, or a straight line as illustrated in FIG. 3a).

The linear lighting device 120 may also comprise one or more sensors that can detect the shape of the linear lighting device 120, which sensor information (or shape information) may be communicated via the one or more signals 130. Information about the physical shape may be used for generating the virtual representation 110 of the lighting device (e.g. the virtual representation 110 of FIGS. 1 and 2).

Figure 3B:
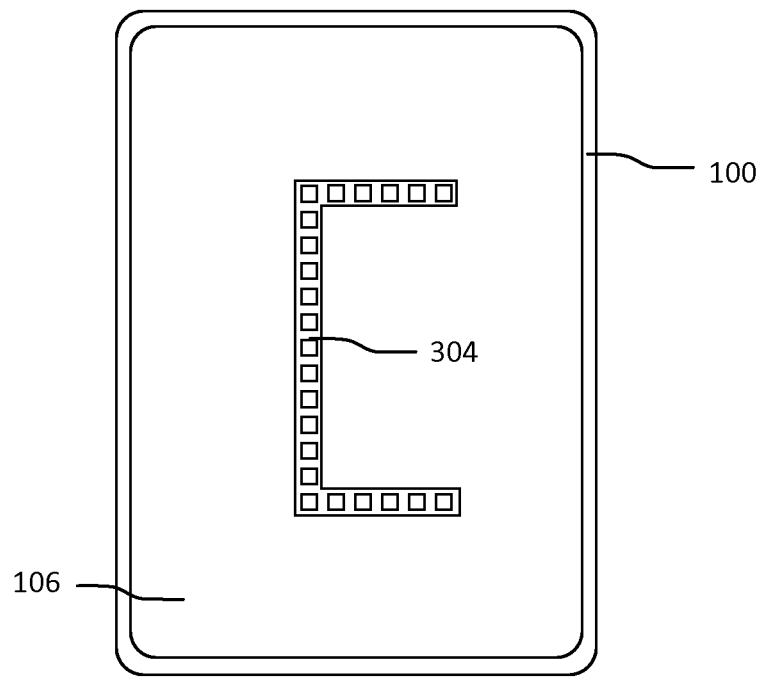

The user interface device 100 may further comprise a user input element (not shown) arranged for receiving a user input, which user input is representative of an adjustment of the shape of the virtual representation 110 of the linear lighting device 120. The display 106 may be further arranged for displaying an adjusted shape of the virtual representation 110 of the linear lighting device 120. The user input element may, for example, comprise a touch screen for receiving a touch input, a camera for detecting a gesture input, a motion sensor such as an accelerometer/gyroscope for detecting movement, an audio sensor for receiving an auditory input, etc. FIGS. 3a and 3b show schematically embodiments of a user interface device 100 receiving a user input, which user input 300 indicates the shape 300' of the virtual representation of the linear lighting device. After generating the initial virtual representation 302 of the linear lighting device 120, a user may provide the user input 300 to adjust the shape of the initial virtual representation 302. The user may, for example, draw 300 the shape of the linear lighting device on a touch screen of the user interface device 100, or the user may make a gesture 300 with his hand to indicate the shape of the linear lighting device, which gesture may be detected by a camera or by a motion sensor which is comprised in, for example, a wearable device that is connected to the user interface device 100. In the example of FIG. 3a, the user draws the L-shaped line 300' on the touch screen 106 of the user input device 100 (the linear lighting device may, for example, be installed under a TV cabinet in the shape of an L). Upon detecting the L-shaped line 300', the processor 104 may map the initial shape 302 on the L-shaped line 300', whereafter the display 106 displays the correct shape 304 of the linear lighting device 120 (see FIG. 3b).

Figure 4A:
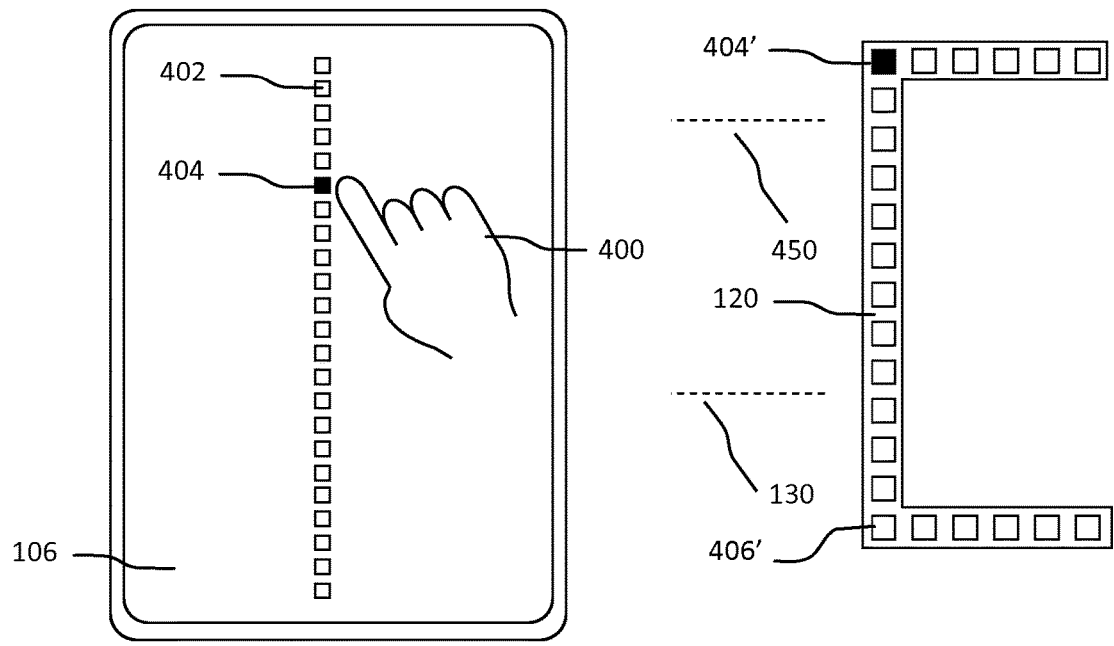
FIGS. 4a, 4b and 4c show schematically embodiments of a user interface device receiving a user input, which user input adjusts the shape of the virtual representation of the linear lighting device.
Figure 4B:
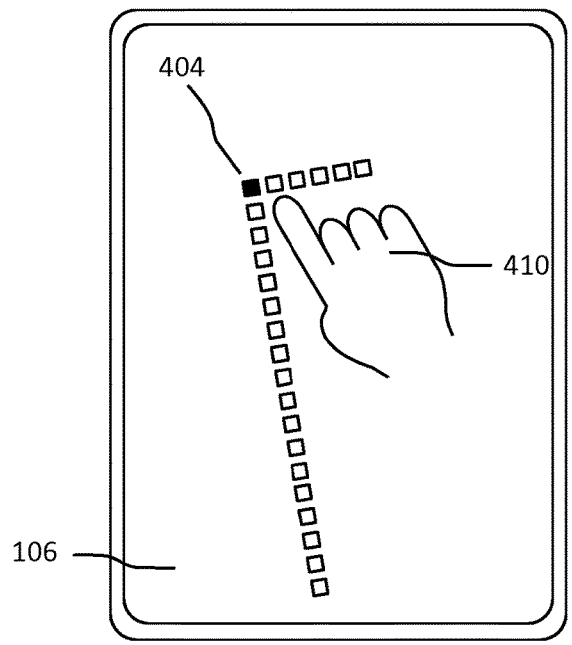
Figure 4C:
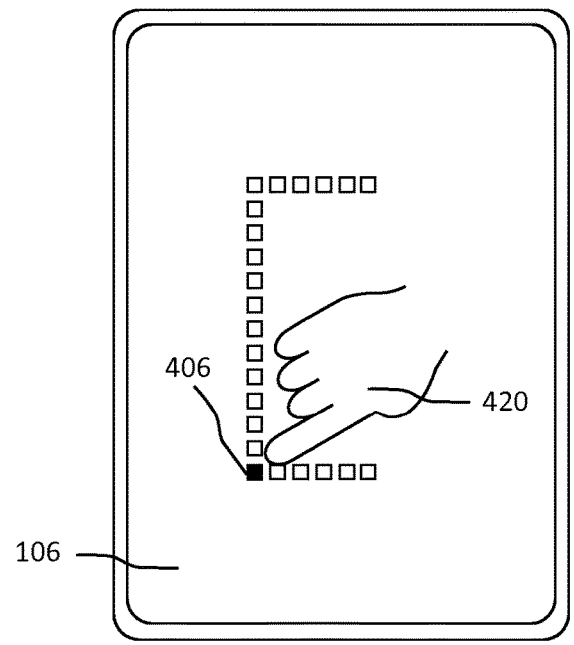

FIGS. 4a, 4b and 4c show schematically an embodiment of a user interface device 100 receiving a user input 400, 410, 420, which user input 400, 410, 420 adjusts the shape of the virtual representation 402 of the linear lighting device 120. A user may, for example, select a control point 404 at a first position (FIG. 4a) on the initial virtual representation 402 (which initial virtual representation 402 may not correspond to the actual shape of the linear lighting device) and drag/move the control point to a second position (FIG. 4b). The control point 404 may be related to an individual light source, or it may be related to a segment of the linear lighting device 120. Additionally, as illustrated in FIG. 4a, the user interface device 100 may send a lighting control command 450 to the linear lighting device 120 for adjusting the light output of at least one light source 404' associated with the control point 404 when the control point 404 is selected 400 or repositioned 410 (e.g. by adjusting the colour, saturation, intensity of the adjusted light source and/or by blinking/flashing the adjusted light source). This visual aid allows the user to see which segment/light source of the linear lighting device 120 is selected 400 or repositioned 410. In the example of FIG. 4a, the user may reposition the control point 404 in order to recreate the C-shape of the linear lighting device. FIG. 4b illustrates how the repositioning 410 of a first control point 404 creates the upper corner of the C-shape, and FIG. 4c illustrates how the repositioning 420 of a second control point 406 (associated with light source 406') creates the lower corner of the C-shape (which C-shape is representative of the shape of the linear lighting device 120, which may, for example, be installed in a C-shaped cove on the ceiling in the living room).

In an embodiment, the processor 104 may be further arranged for providing a visual indicator on the virtual representation 110 and on the linear lighting device 120 before a user selects the control point. The processor 104 may, for example, associate light source 404' with its respective control point and may set the output of light source 404' to green and also set the control point to green. The processor 104 may further associate light source 406' with its respective control point and may set the output of light source 406' to red and also set the control point to red. This provides a visual aid for the user of how the (initial) virtual representation 110 is related to the linear lighting device 120 before adjusting the shape of the linear lighting device 120.

It should be noted that the above-mentioned examples of FIGS. 3a, 3b, 4a, 4b, and 4c are examples of how a user may adjust the shape of the virtual representation, and that a person skilled in the art is able to design alternative ways to adjust the shape of the virtual representation without departing from the scope of the amended claims.

In an embodiment, the user may further provide a user input via the user interface to indicate segments of the linear lighting device 120. In the example of FIG. 4a, the user may, for example, select the light sources between 404' and 406' to indicate a first segment, which first segment comprises the light sources between 404' and 406'. Next, the user may select the light sources to the right of light source 404' to indicate a second segment, which second segment comprises the light sources to the right of light source 404'. Next, the user may select the light sources to the right of light source 406' to indicate a third segment, which third segment comprises the light sources to the right of light source 406'. This may result in, for example, that light sources in a segment behave as a group when a specific light setting is selected for the linear lighting device 120, or that a user may set a light setting to each segment of the linear lighting device 120.

Figure 5:
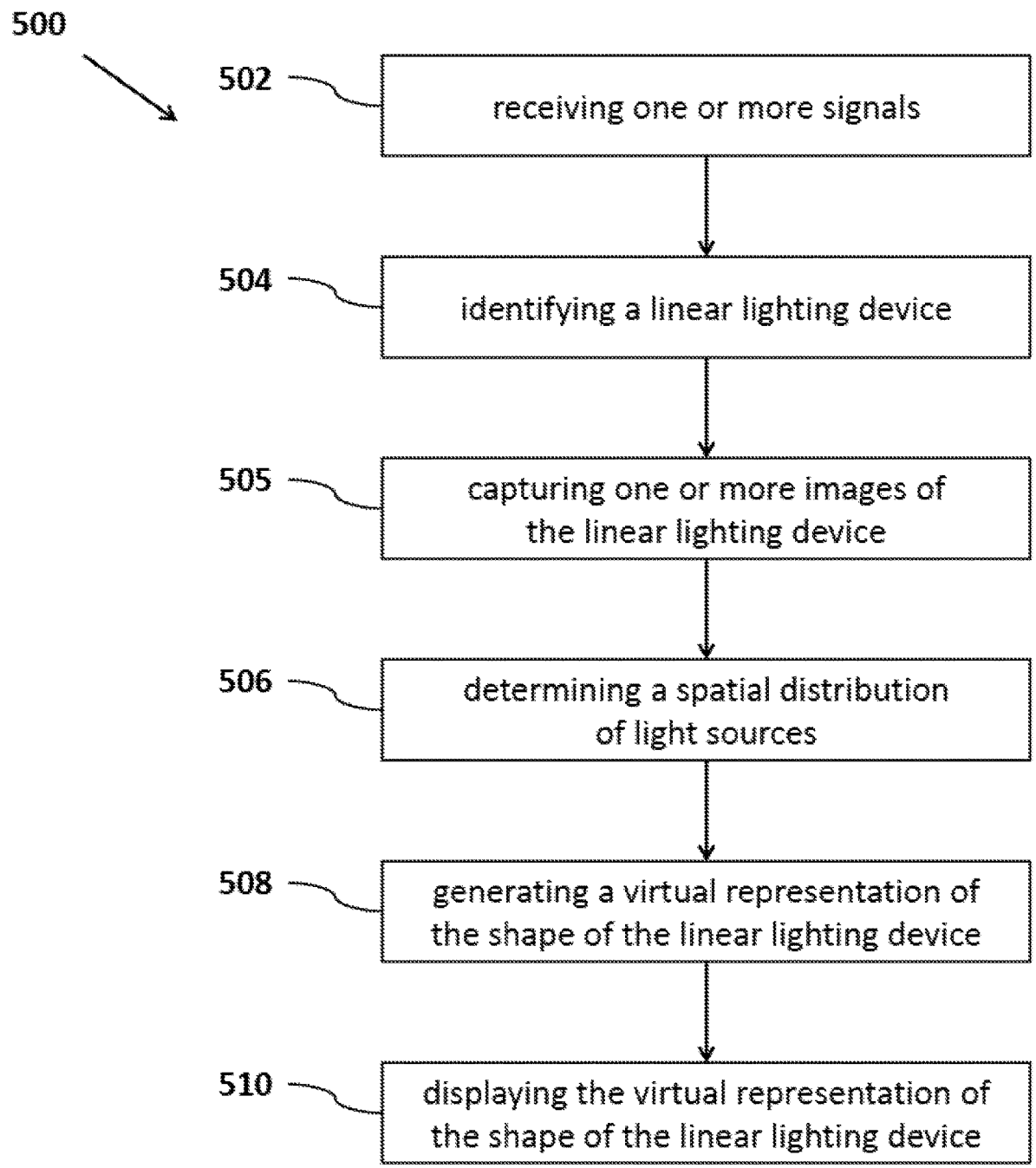
FIG. 5 shows schematically steps of a computer implemented method of generating a virtual representation of a linear lighting device.

FIG. 5 shows schematically steps of a computer implemented method 500 of generating a virtual representation 110 of a linear lighting device 120. The method comprises the steps of:

receiving 502 one or more signals 130 comprising an identifier of the linear lighting device 120 and information about a number and a distribution of the plurality of linearly distributed light sources, identifying 504 the linear lighting device 120 based on the received one or more signals 130, capturing 505 one or more images of the linear lighting device 120 and providing image information representing the one or more images, determining 506 a spatial distribution of the light sources based on the one or more received signals 130 and the image information, generating 508 the virtual representation 110 of the shape of the linear lighting device 120 based on the spatial distribution, and displaying 510 the virtual representation 110 of the shape of the linear lighting device 120.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A computer implemented method of generating a virtual representation of a lighting device, the lighting device comprising a plurality of distributed light sources, the computer implemented method comprising the steps of:
   receiving, from the lighting device, one or more signals comprising an identifier of the lighting device and information indicating the number of the plurality of distributed light sources;
   capturing, with a camera, one or more images of the lighting device;
   determining a shape of the lighting device based on the one or more images;
   determining a spatial distribution of the plurality of distributed light sources based on the received one or more signals and the captured one or more images by mapping the plurality of distributed light sources onto the shape;
   generating the virtual representation of the shape of the lighting device based on the spatial distribution; and
   displaying the virtual representation of the shape of the lighting device.

2. The computer implemented method of claim 1, wherein the received one or more signals further comprise information about a physical shape of the lighting device.

3. The computer implemented method of claim 1, wherein the one or more signals are radio frequency signals received from the lighting device.

4. The computer implemented method of claim 1, wherein the one or more signals are modulated light signals emitted by the lighting device.

5. The computer implemented method of claim 1 further comprising the steps of:
   analyzing the one or more images and retrieving an embedded code from the analyzed one or more images; and
   identifying the lighting device based on the embedded code.

6. The computer implemented method of claim 1 further comprising the steps of:
   providing at least one control point with a position on the virtual representation of the lighting device;
   receiving a first user input representative of a selection of the at least one control point;
   receiving a second user input representative of a repositioning of the at least one control point on the virtual representation of the lighting device;
   generating an adjusted shape of the virtual representation based on the repositioning of the at least one control point; and
   displaying the adjusted shape of the virtual representation of the lighting device.

7. The computer implemented method of claim 6, further comprising the steps of:
   associating the position of the at least one control point relative to the virtual representation with a position of at least one light source of the plurality of light sources relative to the lighting device; and
   adjusting the light output of the at least one light source when the control point is selected or repositioned.

8. A computer program product for a computing device, the computer program product comprising computer program code to perform the computer implemented method of claim 1 when the computer program product is run on a processing unit of the computing device.

9. A computer readable storage medium for storing a computer readable computer program for a computing device, the computer program product comprising computer program code to perform the computer implemented method of claim 1 when the computer program product is run on a processing unit of the computing device.

10. A user interface device for generating a virtual representation of a lighting device configured to be mounted in different shapes, the lighting device comprising a plurality of distributed light sources, the user interface device comprising:
- a receiver for receiving, from the lighting device, one or more signals comprising an identifier of the lighting device and information indicating the number of the plurality of distributed light sources;
- a camera for capturing one or more images of the lighting device;
- a processor for identifying the lighting device based on the received one or more signals, and for determining a shape of the lighting device based on the captured one or more images, and for determining a spatial distribution of the plurality of distributed light sources based on the received one or more signals and one or more images by mapping the plurality of distributed light sources onto the shape, and for generating the virtual representation of the shape of the lighting device based on the spatial distribution; and
- a display for displaying the virtual representation of the shape of the lighting device.

11. The user interface device of claim 10, wherein the user interface device further comprises a user input element arranged for receiving a user input, the user input is representative of an adjustment of the shape of the virtual representation of the lighting device, and wherein the display is arranged for displaying an adjusted shape of the virtual representation of the lighting device.

12. The user interface device of claim 11, wherein the processor is further arranged for providing at least one control point with a position on the virtual representation of the lighting device, and wherein the user input element is arranged for receiving a first user input representative of a selection of the at least one control point and a second user input representative of a repositioning of the at least one control point on the virtual representation of the lighting device, wherein the processor is further arranged for generating the adjusted shape of the virtual representation based on the repositioning of the at least one control point.

13. The user interface device of claim 11, wherein the user input element comprises a touch sensitive surface arranged for receiving the user input.

14. The computer implemented method of claim 1, wherein the one or more signals further comprise information about a distribution of the plurality of distributed light sources in the lighting device.

15. The computer implemented method of claim 1 further comprising the step of identifying the lighting device based on the received one or more signals.

16. The computer implemented method of claim 1, wherein the lighting device is a lighting device.

17. The computer implemented method of claim 16, wherein the plurality of distributed light sources are linearly distributed.

* * * * *